United States Patent [19]

Ohba

[11] Patent Number: 5,083,201

[45] Date of Patent: Jan. 21, 1992

[54] VIDEO IMAGE MOTION DATA GENERATOR FOR COMPUTER GRAPHICS

[75] Inventor: Akio Ohba, Tokyo, Japan

[73] Assignee: Sony Corporation, Tokyo, Japan

[21] Appl. No.: 500,393

[22] Filed: Mar. 28, 1990

[30] Foreign Application Priority Data

Mar. 31, 1989 [JP] Japan ................... 1-82739

[51] Int. Cl.⁵ .................................... H04N 7/18
[52] U.S. Cl. ...................... 358/105; 358/93; 358/138; 340/725
[58] Field of Search ............... 358/105, 93, 139, 138, 358/183, 103; 340/723, 725, 724; 364/521; 382/22

[56] References Cited

U.S. PATENT DOCUMENTS

| | | | |
|---|---|---|---|
| 3,603,729 | 9/1971 | Sperber | 358/105 |
| 3,798,366 | 3/1974 | Hunt | 358/96 |
| 4,698,682 | 10/1987 | Astle | 358/22 |
| 4,783,833 | 11/1988 | Kawabata | 358/105 |
| 4,791,581 | 12/1988 | Ohiba | 364/521 |
| 4,845,557 | 7/1989 | Lang | 358/105 |
| 4,894,716 | 1/1990 | Aschwanden | 358/105 |
| 4,949,286 | 8/1990 | Ohiba | 358/93 |

OTHER PUBLICATIONS

A Simple Motion Detector for Television Signals by D. E. Pearson and T. J. Dennis, 1/73.

Primary Examiner—John K. Peng
Assistant Examiner—Sherrie Hsia
Attorney, Agent, or Firm—Lewis H. Eslinger; Jay H. Maioli

[57] ABSTRACT

A motion information generating apparatus arranged such that a desired portion of a picture displayed on a video monitor receiver is designed and image data corresponding to the desired portion of the designated picture is sampled in a one-dimensional fashion, whereby an information signal indicating a motion of a picture is formed on the basis of the thus sampled image data.

5 Claims, 4 Drawing Sheets

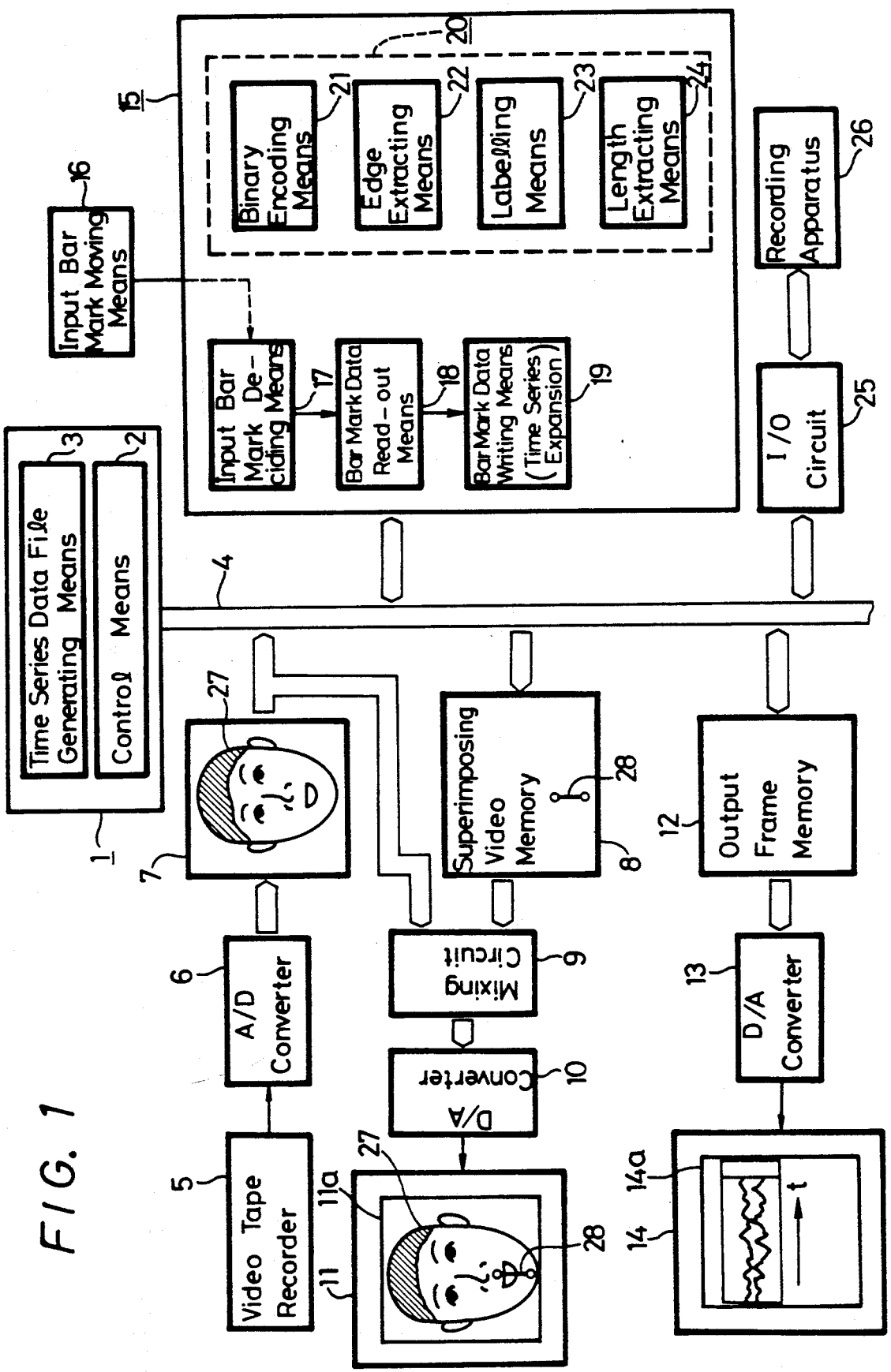

VIDEO IMAGE MOTION DATA GENERATOR FOR COMPUTER GRAPHICS

BACKGROUND OF THE INVENTION

1. Field of the Invention

The present invention relates generally to motion information generating apparatus for generating data indicating a motion of a picture and, more particularly, is directed to a motion information generating apparatus for generating data indicative of a motion of a desired portion of a picture.

2. Description of the Prior Art

With the advancement of image processing techniques, it became possible to make an animation program by using so-called computer graphics (CG). Some present work in animation programs using computer graphics focuses on how to make a character of animation move in complicated and natural way just like a real person. Towards this goal the assignee of the instant application has previously proposed an image processing apparatus (described in U.S. Pat. No. 4,791,581). According to this previously-proposed image processing apparatus, curved surface data of a plurality of primitive countenances are stored and curved surface data of a certain or desired countenance data is formed from the curved surface data of a plurality of primitive countenances by a predetermined interpolation coefficient. However, an apparatus for expressing a complex motion of man in a numeric representation fashion at high accuracy is not yet realized. Also, it is quite difficult to form an interpolation coefficient by which a complex and natural action of man is effected.

OBJECTS AND SUMMARY OF THE INVENTION

Accordingly, it is an object of the present invention to provide an improved motion information generating apparatus which can eliminate the defects encountered in the prior art.

More specifically, it is an object of the present invention to provide a motion information generating apparatus in which even when a position of a character or object is considerably changed in a predetermined event, information indicating a complicated motion of a predetermined portion of the character or the object can be expressed as a function of time by a numeric representation with ease and at high accuracy.

It is another object of the present invention to provide a motion information generating apparatus which can form a data base of operation parameters used to produce an animation program or a movie according to the computer graphics.

According to a first aspect of the present invention, there is provided a motion information generating apparatus for generating data indicative of a motion of a desired portion of a picture displayed on a monitor receiver. This apparatus is comprised of a designating circuit for designating a desired portion of the picture displayed on the monitor receiver, a sampling circuit for sampling in a one-dimensional fashion image data corresponding to the desired portion of the picture designated by the designating circuit, and a generating circuit for generating an information indicating a motion of a picture on the basis of the image data sampled by the sampling circuit.

According to a second aspect of the present invention, a motion information generating apparatus for generating data indicative of a motion of a desired portion of a picture displayed on a monitor receiver is comprised of a first memory for storing therein a video signal supplied from a video signal source, a designating circuit for designating a desired portion of the picture read-out from the first memory and which is displayed on the monitor receiver, a sampling circuit for sampling in a one-dimensional fashion image data corresponding to the desired portion of the picture designated by the designating circuit, a generating circuit for generating an information signal indicating a motion of a picture on the basis of the image data sampled by the sampling circuit, and a second memory for storing therein an information signal indicating a motion of a picture generated by the generating circuit.

The above, and other objects, features and advantages of the present invention, will be apparent in the following detailed description of a preferred embodiment of the invention with reference to the accompanying drawings, in which like reference numerals are used to identify the same or similar parts in the several views.

BRIEF DESCRIPTION OF THE DRAWINGS

FIG. 1 is a block diagram showing an embodiment of a motion information generating apparatus according to the present invention;

DETAILED DESCRIPTION OF THE PREFERRED EMBODIMENT

Figure 3:
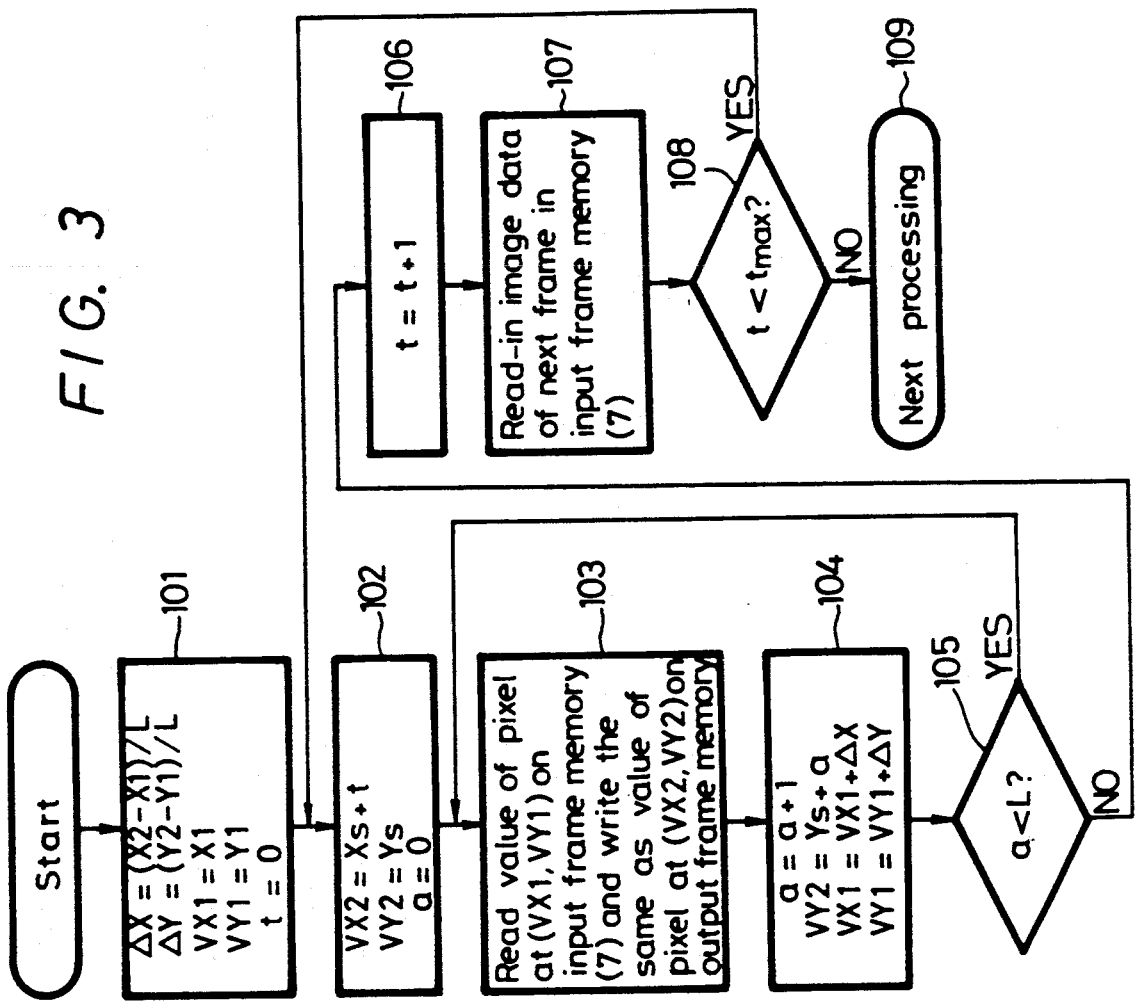
FIG. 3 is a flow chart to which reference will be made in explaining an operation of the motion information generating apparatus of FIG. 1.

An embodiment of a motion information generating apparatus according to the present invention will hereinafter be described in detail with reference to the accompanying drawings.

FIG. 1 shows an embodiment of the motion information generating apparatus according to the present invention.

Referring to FIG. 1, there is shown a host computer 1 which functions as control means 2 for controlling the whole apparatus and as generating means 3 for generating a time series data file involving a motion information. There is shown a system bus 4 which is composed of a data bus, an address bus, a control bus or the like. The host computer 1 controls the whole of the apparatus via the system bus 4.

There is shown a video tape recorder (VTR) 5 in which there is loaded a video tape cassette (not shown) in which various events such as ones involving man's actual motions in a television drama, a sports program or the like. A video signal reproduced by this video tape recorder 5 is processed by some suitable means to provide a luminance signal Y and red and blue color difference signals R-Y and B-Y (according to the so-called 4:2:2 standard) or to provide red, green and blue primary color signals R, G and B. The thus processed video signal is supplied to an analog-to-digital (A/D) converter 6, in which it is converted to digital image data. This image data is supplied to one input/output (I/O) port of an input frame memory 7. The input frame memory 7 might be a 2-buffer memory formed of two frame memories or a complete dual port memory in which data can be independently read and/or written in two ports, etc. The other I/O port of the input frame memory 7 is connected to the system bus 4 and one input port of a mixing circuit 9.

There is shown a superimposing video memory 8. This superimposing video memory 8 includes the same address area as that of the input frame memory 7 in size to store selection data of one bit each in response to image data of, for example, 16 bits of one pixel (picture element) of the input frame memory 7. The selection data of one bit at a high level portion thereof corresponds to a bar mark 28 which will be described later. The I/O ports of the superimposing video memory 8 are respectively connected to the system bus 4 and the other input port of the mixing circuit 9. The mixing circuit 9 mixes the image data read out of the input frame memory 7 and the selection data read out from the superimposing video memory 8 and supplies mixed data to a digital-to-analog (D/A) converter 10. The D/A converter 10 supplies a mixed analog video signal to a monitor receiver 11. The monitor receiver 11 displays on a picture screen 11a thereof a picture which results from mixing a picture 27 corresponding to the input frame memory 7 and the bar mark 28 instructed by the superimposing video memory 8. In that case, although the picture 27 is changed at a frame frequency of 30 Hz, the position of the bar mark 28 is kept constant so long as the operator does not command as will be described later.

There is provided an output frame memory 12 in which there are written image data and so on extracted from the input frame memory 7. One and the other I/O ports of the output frame memory 12 are respectively connected to the system bus 4 and the input port of a D/A converter 13, and the analog output of the D/A converter 13 is supplied to a monitor receiver 14.

There is shown an image processor 15. This image processor 15 samples image data from the selected area of the input frame memory 7 in response to the instruction from the host computer 1 and writes the image data sampled in a predetermined area of the output frame memory 12 by timebase-compressing or timebase-expanding the same data. In order to select the area in which the image data of the input frame memory 7 is sampled, the image processor 15 writes data of high level in the superimposing video memory 8 at a certain area corresponding to a one dimensional segment such as a straight line or curve. The portion of the high level constructs the bar mark 28. The address area in the input frame memory 7 corresponding to the address area of the bar mark 28 becomes a region in which the image data is sampled by the image processor 15. The position of the bar mark 28 in the superimposing video memory 8 can be freely changed by operating input bar mark moving means (e.g., a mouse or a track ball) 16 from the outside. Accordingly, if the function of the image processor 15 is expressed from a hardware standpoint, it is to be appreciated that the image processor 15 is comprised of input bar mark deciding means 17 for deciding the position of the bar mark 28, bar mark data read-out means 18 for reading image data from the input frame memory 7 at is address area corresponding to the bar mark 28 and bar mark data writing means 19 for writing the image data thus read-out in the output frame memory 12. The bar mark 28 is made by a one-dimensional manner and data in which the image data defined by the bar mark 28 is expanded in the time base direction is referred to as expanded data.

Further, the image processor 15 include image processing means 20 for forming a motion information signal from the expanded data written in the output frame memory 12. This image processing means 20 can be realized by a software of a microcomputer. As a nonlimiting example, the image processing means 20 can be comprised of binary encoding means 21 for encoding the expanded data in the binary form, edge extracting means 22 for extracting an edge of binary data, labelling means 23 for assigning data of high level only to the edge portion of, for example, red color (for example, configuration of lips, etc.), length extracting means 24 for extracting the length between labelled two points as a function of time and for again writing the extracted function in the output frame memory 12, etc.

In FIG. 1, reference numeral 25 designates an I/O circuit and 26 a recording apparatus such as a magnetic disc apparatus or the like. Information such as length or the like written in the output frame memory 12 is recorded on the recording apparatus 26 via the system bus 4 and the I/O circuit 25.

Figure 2A:
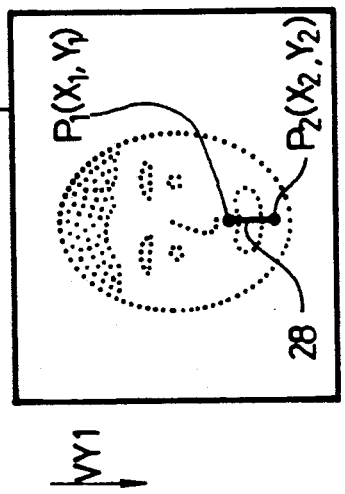
FIG. 2A is a schematic diagram showing an example of data stored in an input frame memory of the motion information generating apparatus of FIG. 1.
Figure 2B:
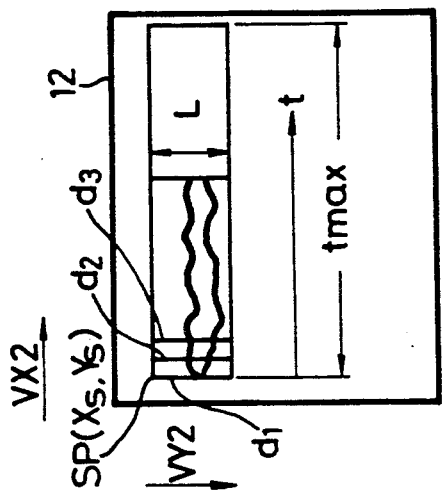
FIG. 2B is a schematic diagram showing an example of data stored in an output frame memory of the motion information generating apparatus of FIG. 1.

With reference to steps in FIG. 3, let us explain an operation in which image data corresponding to the bar mark 28 is read out from the image data of one frame time stored in the input frame memory 7 and is written in the output frame memory 12. In that case, as shown in FIG. 2A, coordinates of each pixel of the input frame memory 7 are expressed by (VX1 (in the horizontal direction) and VY1 (in the vertical direction)). Whereas, as shown in FIG. 2B, coordinates of each pixel of the output frame memory 12 are expressed by (VX2 (in the horizontal direction) and VY2 (in the vertical direction)), and coordinates of a starting point $P_1$ and an ending point $P_2$ of the bar mark 28 in the input frame memory 7 are expressed by (X1,Y1) and (X2,Y2), respectively.

Image data corresponding to the position of the bar mark 28 is read-out from the input frame memory 7 at every frame, timebase-compressed or timebase-expanded and is written in the output frame memory 12 at its adjacent areas $d_1, d_2, d_3, \ldots$ of L dots in the vertical direction. In this embodiment, a time difference between the areas $d_1, d_2, d_3$ corresponds to a 1/30th of a second which is a frame cycle. More precisely, image data corresponding to the position of the bar mark 28 is sequentially written in the output frame memory 12 at every frame as a function of a time t from left to right in FIG. 2B. A length in which image data can be expanded in the horizontal direction is represented by $t_{max}$.

Referring to the flow chart of FIG. 3, following the Start of operation, the processing of the host computer 1 proceeds to step 101. In step 101, in order to write image data corresponding to respective pixels on the bar mark 28 into the output frame memory 12 at the areas $d_1, d_2, d_3, \ldots$ of L dots thereof, the image data are timebase-compressed or timebase-expanded. Compressing ratios $\Delta X$ and $\Delta Y$ in the horizontal and vertical directions are expressed as follows:

$$\Delta X = (X2 - X1)/L \tag{1}$$

$$\Delta Y = (Y2 - Y1)/L \tag{2}$$

The timebase compressing ratio means that the length of ΔX dots in the horizontal direction and the length of ΔY dots in the vertical direction on the input frame memory 7 are compressed into the length of one dot in the vertical direction on the output frame memory 12. When ΔX and ΔY are not integers, an interpolation is performed by using image data of nearby four pixels, whereby image data at a certain position on the input frame memory 7 is computed. Further, in step 101, initial values of coordinates (VX1,VY1) are set to the coordinates (X1,Y1) of the starting point $P_1$ of the bar mark 28. After the time t is reset to zero, image data of first frame is read-in the input frame memory 7.

Then, the processing of the host computer 1 proceeds to the next step 102. In step 102, the initial values of coordinates (VX2,VY2) of the output frame memory 12 are set to $(X_{s+t}, Y_s)$ and a parameter a is reset to zero. The coordinates $(X_s, Y_s)$ become coordinates of a starting point SP of the area in which image data is written (see FIG. 2B).

The processing of the host computer 1 proceeds to steps 103 and 104, whereat a value of a pixel at the coordinates (VX1,VY1) on the input frame memory 7 is read-out and is written as a value of a pixel at the coordinates (VX2,VY2) on the output frame memory 12. After the value of parameter a is incremented by 1, the values of the coordinate values VY2, VX1 and VY1 are updated by the following equations.

$$VY2 = Y_{s+a} \tag{3}$$

$$VX1 = VX1 + \Delta X \tag{4}$$

$$VY1 = VY1 + \Delta Y \tag{5}$$

The processing of the host computer 1 proceeds to the next decision step 105, whereat it is determined whether or not the value of parameter a is less than L. If the value of the parameter a is less than L as represented by a YES at step 105, the processing of the host computer 1 returns to step 103. In step 103, a value of the next pixel of the input frame memory 7 is read-out and is written in the output frame memory 12. If on the other hand the value of the parameter a reaches L as represented by a NO at step 105, which means that the extraction of all image data of the bar mark 28 is completed, then the processing of the host computer 1 proceeds to the next step 106.

In step 106, the value of the time t is incremented by 1, and image data of the next frame is read-in the input frame memory 7 in step 107.

Then, the processing of the host computer 1 proceeds to the next decision step 108, whereat it is determined whether or not the time t is less than the maximum value $t_{max}$. If the time t is under the maximum value $t_{max}$ as represented by a YES at step 108, then the processing of the host computer 1 returns to step 102. In step 102, the image data extracted by the bar mark 28 is written in the output frame memory 12 at its area in which the time base of the output frame memory 12 is displaced to the right by 1, i.e., the area $d_2$. If the time t reaches the maximum value $t_{max}$ as represented by a NO at step 108, which means that the sampling of image data during a predetermined time period is completed, the processing of the host computer 1 proceeds from step 108 to the next step 109, wherein the processing of the next stage is executed.

An example of an operation in which the processing of the next stage in step 109 (see FIG. 3) is executed will be described with reference to FIGS. 4A to 4D.

Figures 4A, 4B, 4C, 4D:
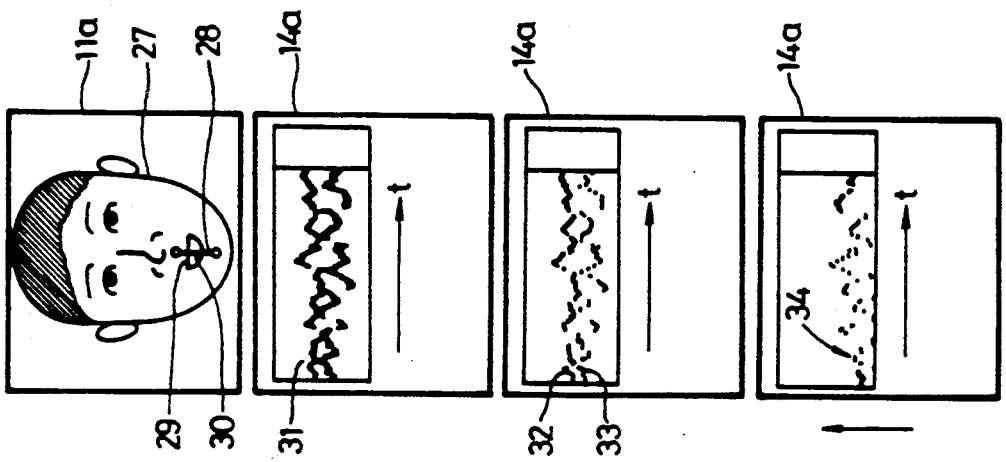
FIGS. 4A to 4D, FIGS. 5A to 5D and FIG. 6 are schematic diagrams showing examples of processed results of the motion information generating apparatus of FIG. 1.

An input picture screen 11a in FIG. 4A expresses a picture corresponding to the image data read-in the input frame memory 7, whereas an output picture screen 14a in FIG. 4B expresses expanded data 31 which is provided by sampling the input picture screen 11a at the position of the bar mark 28.

In this embodiment, on the input picture screen 11a of FIG. 4A there is displayed an event in which man 27 speaks predetermined words, and the bar mark 28 is positioned so as to cross an upper lip 29 and a lower lip 30 of the man 27. In that case, the expanded data 31 in FIG. 4B plots the spacing between the upper and lower lips 29 and 30 under the condition that the time base is represented in the abscissa. However, the data 31 is not sufficient and cannot be applied to the production of animation picture so that, after the expanded data 31 of FIG. 4B is converted to the binary data, a red portion of that data, i.e., portions corresponding to the upper and lower lips 29 and 30 are labelled to high level. Further, a lower side edge 32 of the upper lip 29 and an upper side edge 33 of the lower lip 30 are extracted and plotted as shown in FIG. 4C.

By plotting the spacing between the edges 32 and 33 relative to the time base, it is possible to obtain time series data 34 as shown in FIG. 4D. The time series data 34 corresponds to an opening ratio of lips when man speaks predetermined words. This time series data 34 is stored in the output frame memory 12.

Further, if the time series data 34 of FIG. 4D is recorded in the recording apparatus 26 and the opening ratio of lips of a character in the animation program is changed in accordance with the time series data 34 upon production of the animation program, it is possible to make the animation character behave just like a real person. For example, computing an interpolation coefficient of an animation producing apparatus, described in U.S. Pat. No. 4,791,581, from the time series data 34 and making the animation on the basis of the computed interpolation coefficient, it is possible to make the animation character behave like the real person.

Figures 5A, 5B, 5C, 5D:
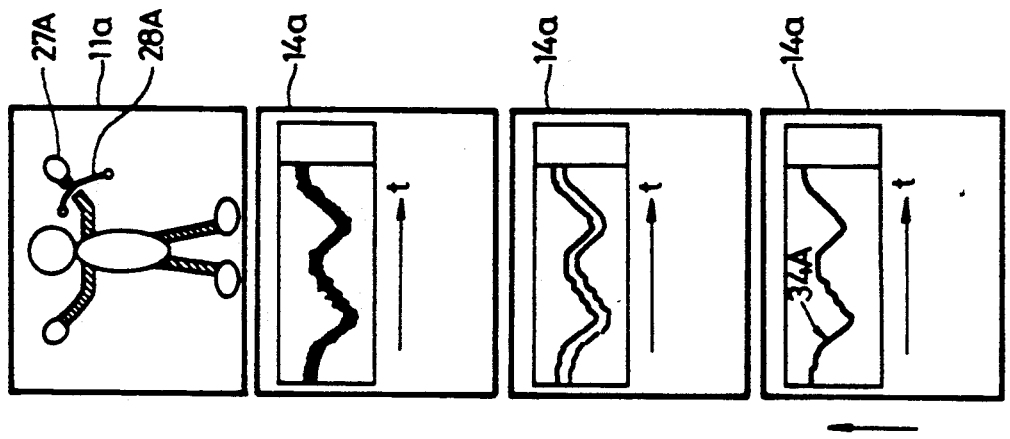

Furthermore, let us assume that on the input picture screen 11a there is displayed such an event that animation character 27A waves his hands as shown in FIG. 5A. In that case, in order to express the motion of hands in a numeric representation, the position of a bar mark 28A has to cross the arm of the animation character 27A. In that case, the bar mark 28A is formed as an arcuate bar mark. At that time, expanded data, provided by plotting image data sampled by the bar mark 28A under the condition that the time base is represented in the abscissa, is represented on an output picture screen 14a as shown in FIG. 5B. FIG. 5C illustrates expanded data that is obtained after some suitable processings such as a binary-encoding processing, a labelling processing and an edge extracting processing. FIG. 5D shows time series data 34A in which a position of an intermediate point of two edges shown in FIG. 5C is plotted relative to the time base. The time series data 34A is equivalent to a numeric representation of a motion in which man waves his hands.

According to the motion information generating apparatus of this embodiment, of the image data sequentially written in the input frame memory 7, the portion corresponding to the one-dimensional bar mark 28 and which is written in the superimposing video memory 8 is sampled, and the thus sampled image data is plotted along the time base by the output frame memory 12, whereby a complex motion of the animation character in the predetemined event sequentially written in the input frame memory 7 can be expressed as the function of time by the numeric representation with ease.

Figure 6:
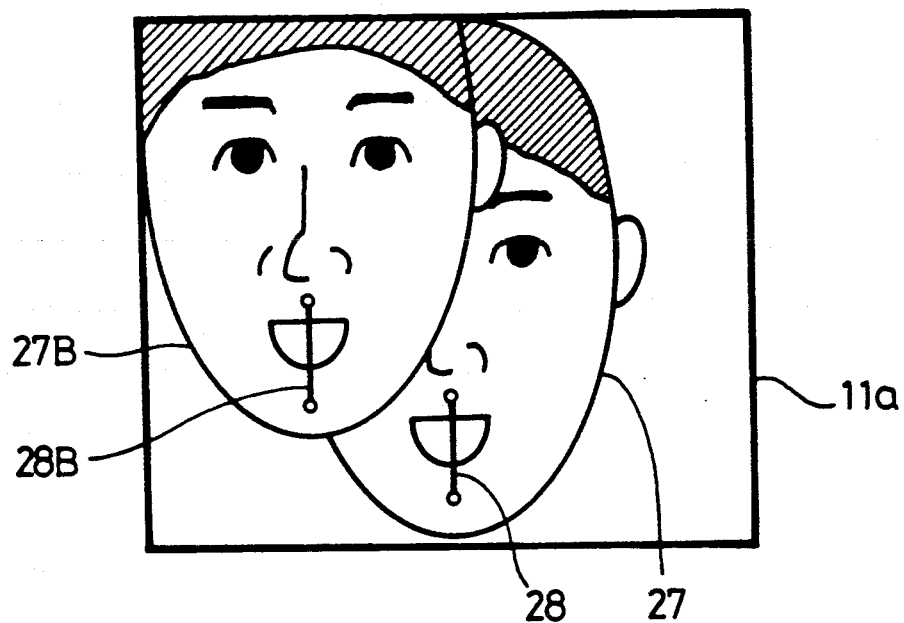

While the position of the bar mark 28 is fixed in the above-described embodiment as shown in FIG. 2A, the position of the bar mark 28 may be moved in accordance with the movement of the animation character 27 in the input picture screen 11a as shown in FIG. 6 from a time standpoint. In the example of FIG. 6, when the character 27 is moved to a position 27B with a change of time, the bar mark 28 is moved to a position 28B simultaneously. In that case, the bar mark 28 may be rotated as well as being moved linearly. The positional displacement of the bar mark 28 can be performed with ease by operating the input bar mark moving means 16.

As described above, according to this embodiment, even when the position of character or object is considerably changed in a certain event, there is then the advantage that the information of complex movement of the characters or object can be expressed as the function of time by the numeric representation easily and precisely.

Further, by accumulating various informations of complex motion obtained by the motion information generating apparatus of this embodiment, it is possible to form a data base of operation parameters used to produce an animation program (or movie, etc.) by computer graphics.

As set forth above, according to this invention, in the desired event of television program recorded by a video tape recorder or the movie, informations of complex motions such as when man speaks or man waves his hands can be expressed in the numeric representation with ease. Furthermore, when these motion informations are utilized as parameters, a character in the animation program according to the computer graphics can act like the real person.

Having described a preferred embodiment of the invention with reference to the accompanying drawings, it is to be understood that the present invention is not limited to that precise embodiment and that various changes and modifications could be effected by one skilled in the art without departing from the spirit or scope of the invention as defined in the appended claims.

I claim as my invention:

1. A motion information generating apparatus for generating data indicative of motion of a predetermined portion of an image in a series of video picture frames formed of image data and displayed on a video monitor receiver, comprising:

designating means for designating a one-dimensional segment of each frame of said series of video picture frames successively displayed on said video monitor receiver, said one-dimensional segment extending across said predetermined portion of said image;

digital memory means for storing digital image data of said series of video picture frames;

means for reading out from said memory means digital image data corresponding to said predetermined portion for each frame of a consecutive series of video picture frames and said one-dimensional segment of said frame designated by said designating means; and image processing means for processing said image data read out from said means for reading out and producing therefrom an information signal indicating motion of an edge in said predetermined portion of said image on the basis of image data in said series of video picture frames.

2. A motion information generating apparatus as claimed in claim 1, wherein said image processing means is comprised of detecting means for detecting said edge of said image within said one-dimensional segment of said image data produced by said means for reading out and producing an output signal; and time series data forming means for forming time series data indicating motion of said predetermined portion of said image on the basis of said output signal from said detecting means.

3. A motion information generating apparatus for generating data indicative of motion of a predetermined portion of an image in a series of video picture frames formed of image data and displayed on a video monitor receiver, comprising:

first memory means for storing therein and reading out therefrom digital image data of one frame of said series of video picture frames supplied from a video signal source;

designating means for designating a one-dimensional segment of the one frame of said series of video picture frames stored in said first memory means, said segment extending across said predetermined portion of the image displayed on said video monitor receiver;

means for reading out from said first memory means image data corresponding to said predetermined portion for each frame of a consecutive series of said video picture frames and said one-dimensional segment of said one frame designated by said designating means;

image processing means for processing said image data read out from said means for reading out and producing therefrom a digital information signal indicating motion of an edge in said predetermined portion of said image on the basis of said image data in said consecutive series of video picture frames; and second memory means for storing therein said digital information signal produced by said image processing means.

4. A motion information generating apparatus as claimed in claim 3, wherein said designating means is comprised of input means for inputting data used to designate said one-dimensional segment of said one frame; and superimposing means for superimposing bar data indicating said one-dimensional segment upon a video signal read-out from said first memory means on the basis of said data inputted from said input means.

5. A motion information generating apparatus as claimed in claim 3, wherein said image processing means is comprised of detecting means for detecting said edge within said one-dimensional segment of said one frame on the basis of said image data of a consecutive series of video picture frames read-out from said means for reading out and producing an output signal; and time series data generating means for generating time series data indicating motion of said predetermined portion of said image on the basis of said output signal from said detecting means, said time series data being written in said second memory means as an information signal indicating motion of said predetermined portion of said image.

* * * * *